Patented Aug. 14, 1934

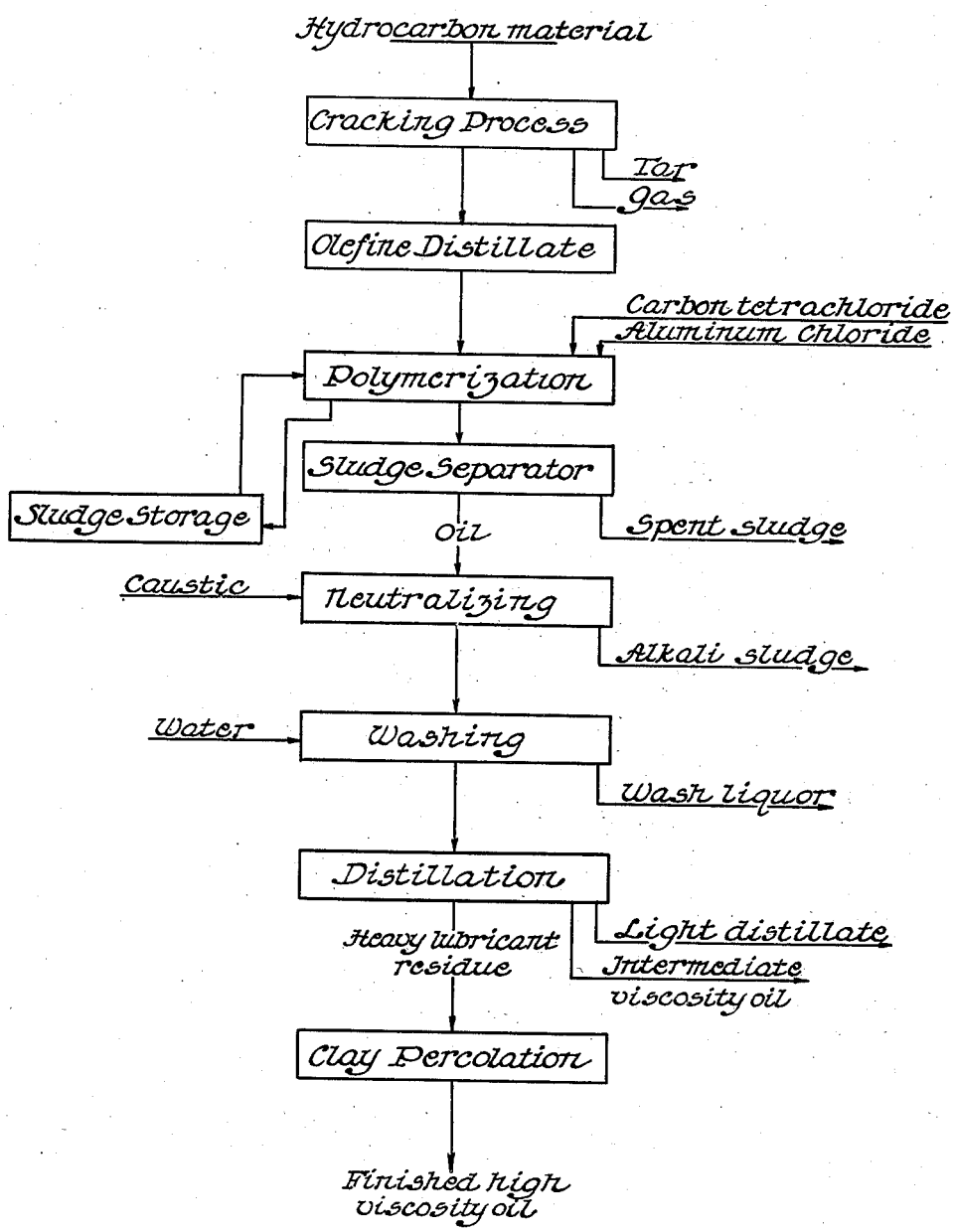

1,970,402

UNITED STATES PATENT OFFICE 1,907,402

ART OF PRODUCING LUBRICATING OILS

Harold R. Snow, Hammond, Ind., assignor to Standard Oil Company, Whiting, Ind., a corporation of Indiana Application May 15, 1930, Serial No. 452,807

22 Claims. (Cl. 196—78)

This invention relates to the production of lubricating oils from suitable hydrocarbon material and refers more particularly to the production of lubricating oils of low cold test and high viscosity from hydrocarbon oils containing a considerable proportion of unsaturates or olefins. The invention is particularly concerned with improvements in processes of the type described in U. S. Patents Nos. 1,309,432 and 1,374,277 to R. H. Brownlee and the co-pending application of F. W. Sullivan and V. Voorhees Serial No. 347,446, filed March 15, 1929, now Patent No. 1,955,260, wherein the hydrocarbon oil containing unsaturates is preferably in the gasoline boiling point range, although the present process may likewise be employed in the treatment of heavier stocks.

In the above type of processes a hydrocarbon oil containing a considerable proportion of unsaturates or olefins is brought into the presence of a suitable catalyst capable of promoting a polymerizing reaction in the oil to polymerize the unsaturates present and thereby produce a lubricant having an improved viscosity-temperature gradient as well as a remarkably low cold test and Conradson carbon test. The catalyst employed in such reaction ordinarily comprises an anhydrous metal halide, preferably a chloride, for example aluminum chloride. Other effective catalysts are boron fluoride, aluminum bromide and anhydrous ferric chloride. The polymerization may be conducted at a temperature of from 100 to 400° F., but is ordinarily found most desirable to conduct the reaction at a temperature which does not exceed 250° F., a longer period of time being required at lower temperatures and a higher yield of more viscous products being produced. During polymerization the mixture is thoroughly agitated. Substantial yields are obtained in three or four hours at temperatures of 175° F. and higher, but it is preferred to prolong the time of reaction to 15 to 20 hours, and at lower temperatures to as long as 50 hours, in order to obtain a maximum yield of lubricating oils.

While with the above type of processes a considerable quantity of viscous oils may be produced I have found that considerably more of such oils can be formed if, during the polymerization, a halogen acid is introduced into the oil, preferably before the oil is brought into the presence of the catalyst. This acid preferably should be in the anhydrous state and may be produced independently of the polymerization reaction and then introduced into the oil at the time it is in the presence of the catalyst. I have found, however, that a similar effect is produced by the addition of certain organic halides, particularly of the alkyl halides. It is preferred to employ an alkyl chloride, although alkyl bromides have been found to be capable of producing a similar effect. This has led me to conclude that the alkyl halides function to cause the formation in the oil of a halogen acid. Apparently, under the influence of the metal halide catalyst, halogen acid is liberated and is the active promoter of the polymerization reaction. In order to define these various substances they will be referred to as a halogen acid-yielding promoter, this term including not only the halogen acid itself, but the organic halides, specifically alkyl halides.

It is preferred to employ a metal chloride as the catalyst for effecting the polymerization reaction, the most satisfactory metal chloride having been found to be aluminum chloride. With this particular metal chloride the preferred halogen acid yielding promoter is hydrochloric acid. From the standpoint of commercial operability of the process, it is preferred to employ one of the substances which it is believed yields this acid within the oil in the presence of the metal halide. Members of the alkyl chloride group have been found to be the most satisfactory halogen acid yielding promotors; for example carbon tetrachloride, ethylene dichloride, methyl chloride, and amyl chloride, all of which have been found to definitely increase the yield of viscous products from the reaction.

After polymerization, certain heavier products, such as a tar or a metal halide sludge, are separated from the oil. Most of this sludge can be separated by settling, but in order to obtain oils of the best color and lowest Conradson carbon test, it is desirable to follow the settling step by a filtering operation so that the remaining sludge is removed from the oil. This may be accomplished by filtering with a small quantity of adsorbent earth, such as clay fines, or by prolonged settling, for example, 48 hours at 100–150° F. The oil may then be washed with an alkaline solution, for example a 5 to 10% solution of caustic soda, if neutralization is required. The oil is then reduced by steam and fire or vacuum distillation to remove light oils and naphtha leaving a lubricating residue which may be separated by distillation to yield lubricating oils of desired viscosity.

I have found that at least a portion of the polymerization reaction may be effected by employing as a catalyst the sludge formed in the polymerization of a previous batch of unsaturates, or unsaturate-containing oil, in the presence of a metal halide, particularly aluminum chloride. The halogen acid yielding promoter is added with or before the sludge and aids the reaction in the manner already described. Considerable polymerization is effected by the sludge; for example, a wax distillate having a 64% unsaturate content and a gravity of 58° Bé. may have a gravity of 46 to 47° Bé. after the sludge treatment. After the polymerization induced by the sludge has ceased, the sludge is withdrawn and an additional quantity of halogen acid yielding promoter together with a quantity of fresh metal halide is added. The polymerization then continues and more viscous products are produced. By employing the sludge formed in the polymerization of a previous batch with such metal halides, to effect at least a partial polymerization, it is much easier to control the reaction which occurs when the metal halide itself is added. The sludge also has admixed with it a considerable quantity of polymerized oil from the previously treated batch in which it was produced, a considerable portion of which is given up to the oil in which it is employed as a catalyst. It is preferred to use the sludge only once in this capacity. The process is shown diagrammatically in the accompanying drawing which forms a part of this specification.

It has been found that products of the best character, particularly as regards to temperature-viscosity co-efficient, are produced from the distillates produced from the cracking of a high boiling product consisting largely or entirely of normal paraffin hydrocarbons. For example, I may use hydrocarbon waxes which are now well understood to consist substantially of straight-chain paraffin hydrocarbons. This wax may suitably be paraffin wax which occurs in Pennsylvania and Mid-Continent crude petroleum or other waxy material, such as petrolatum, slop-wax, ozokerite wax, or other hydrocarbon waxes. It is to be understood that the conversion products of such waxy substances are merely the preferred source of unsaturated material to be polymerized and that other unsaturated hydrocarbon materials may be employed in their stead, such as cracked distillates from gas oils, crude residues, etc., and heavier oils containing unsaturates.

In producing unsaturated distillates from such high-boiling normal paraffin hydrocarbon material, it is preferable to conduct the cracking reaction under low pressure and under substantially vapor phase conditions, at temperature between 750 and 1100° F. and at pressures below 100 lbs. In general, it is preferred to secure maximum yield of desired products from a given initial material, as variations of temperature and pressure may materially effect the ultimate yield. If desired, the distillate from the cracking operation may be fractionated into several portions which may be separately polymerized to products containing higher proportions of lighter or heavier lubricant products, according to the nature of the cracked fraction employed.

The advantages of the present invention will be more particularly apparent from the following specific examples and data derived from a number of operations.

A distillate obtained by cracking paraffin wax stock, containing not over 15% of oil, was found to contain 64% of unsaturated hydrocarbons and had a gravity of 57–58° Bé., an initial boiling point of 100–110° F. and an end point of 500–520° F. This distillate when polymerized with aluminum chloride sludge and aluminum chloride yielded about 35% by volume of lubricant of a viscosity of 85–90 sec. Saybolt at 210° F., and about 7–8% of lubricant having a viscosity of 195–205 sec. Saybolt at 210° F. When carbon tetrachloride was added to this same distillate during its polymerization with aluminum chloride sludge and aluminum chloride, under substantially the same conditions of operation, the distillate yielded about 41% by volume of lubricant of a viscosity of 85–90 sec. Saybolt at 210° F. and about 19–20% by volume of lubricant of a viscosity of 195–205 sec. Saybolt at 210° F. The above proportions by volume are based on the amount of distillate treated.

The amount of carbon tetrachloride necessary is ordinarily very small, about 0.1 to 0.5% by volume of the distillate treated ordinarily being sufficient. Of course, the proportions necessary will vary with the percentage of unsaturated hydrocarbons contained in the distillate and unsaturated hydrocarbon materials from other sources may require different proportions. The amount of sludge employed is ordinarily all of the sludge produced by the polymerization with a metal halide of a previous batch of the same size. Of course, more or less sludge may be employed, but as a practical matter it is not necessary to use a greater amount than that produced when a previous batch was treated with the metal halide.

The preferred metal halide, as already mentioned, is aluminum chloride and the amount employed varies considerably. With a batch of 9000 gallons of the above described cracked wax distillate, it was found that in order to obtain the best results not less than 1400 lbs. and preferably from 1600 to 1800 lbs. should be used. The amounts refer to an aluminum chloride produced by treating bauxite with chlorine. The amount of aluminum chloride required may vary, depending upon its quality and its effectiveness. The amount of sludge produced will vary with the amount of metal halide employed, for example 1000 lbs. of the above aluminum chloride produced 650 gallons of sludge and 1800 lbs. produced 1350 gallons of sludge from the above described cracked wax distillate.

A number of runs were carried out on the same type of stock, i. e., a distillate produced by the cracking of petroleum wax. When the halogen acid yielding promoter was employed it functioned to increase the yield of the more viscous oils and under some conditions increased, as well, the yield of less viscous oils. The promoters employed were hydrochloric acid gas and a number of organic halides (carbon tetrachloride, ethylene dichloride, methyl chloride, ethyl chloride, amyl chloride, etc.) and the catalysts employed were metal halides (aluminum chloride, boron fluoride, aluminum bromide, anhydrous ferric chloride, etc.) and metal halide sludge formed in previous reactions. In all of these runs equal amounts of the same type of stock were treated. The results secured were in general similar, and the following are typical:

In one series of such operations two batches of such stock were treated with aluminum chloride from two different sources and two separate batches were similarly treated in the presence of carbon tetrachloride as a promoter. One of the batches, without the employment of a promoter, yielded 45.5% of 90 sec. viscosity oil (at 210° F.) and 26.5% of 200 sec. viscosity oil (at 210° F.), and when carbon tetrachloride was employed as a promoter a similar batch yielded 88% of 90 sec. viscosity oil (at 210° F.) and 50% of 200 sec. viscosity oil (at 210° F.). The other batches which were reacted upon with aluminum chloride from another source, yielded 68.8% of 90 sec. viscosity oil (at 210° F.) and 20.4% of 200 sec. viscosity oil (at 210° F.) without the use of a hydrochloric acid yielding promoter and 67.6% of 90 sec. viscosity oil (at 210° F.) and 36.7% of 200 sec. viscosity oil (at 210° F.) when carbon tetrachloride was employed as a promoter. In the above runs, the proportion of aluminum chloride used was 25 grams per liter and of carbon tetrachloride 6.25 c. c. per liter.

In another series of runs, the stock was polymerized with a metal chloride alone and yielded 52.8% of 90 sec. viscosity oil (at 210° F.) and 21.3% of 200 sec. viscosity oil (at 210° F.). A similar batch of the same stock when reacted upon with metal chloride sludge, produced in a previous treatment of a batch of the same stock, yielded 45.3% of 90 sec. viscosity oil (at 210° F.) and 22.9% of 137 sec. viscosity oil (at 210° F.), no 200 sec. viscosity oil (at 210° F.) being produced. When another batch of such stock was treated similarly with sludge in the presence of 3 cc. of carbon tetrachloride per liter, 41.6% of 90 sec. viscosity oil (at 210° F.) and 5.4% of 200 sec. viscosity oil (at 210° F.) was produced.

A number of other runs were carried out in which various metal halides and sludges of such halides were employed as catalysts in conjunction with various organic hydrochloric acid yielding promoters. The metal halides so employed included boron fluoride, aluminum bromide, and anhydrous ferric chloride and the hydrochloric acid yielding promoters included hydrochloric acid gas, ethylene dichloride, methyl chloride, ethyl chloride and amyl chloride. In all of these runs, wherein such promoters were employed, the yield of viscous oils was markedly increased. Also a number of runs were carried out in which organic bromides were employed as halogen acid yielding promoters in conjunction with a number of metal halides and sludges thereof as catalysts. In these runs the organic bromides were found to increase the yield of viscous oils.

It is obvious that the amount of organic halide necessary to effect a given or maximum yield will vary with the particular substance employed as a promoter. However, the maximum amount necessary may be readily determined by experimentation in each particular case. Of course, when less than the maximum amount is employed, the yield of viscous oils will be lessened.

A commercial scale operation was conducted as follows:

A distillate obtained from the vapor phase cracking of stock containing 85% of paraffin wax and 15% of oil was charged into a large chamber equipped with agitating means. This distillate had a maximum end point of 500° F. and a gravity of 58 to 60° A. P. I. Fifteen gallons of carbon tetrachloride and 800 gallons of aluminum chloride sludge produced in the polymerization of a previous batch were added to the charge. The mass was maintained at about 135° F. for a period of 12 hours, the mass being agitated. At the end of this time the sludge was allowed to settle and was drawn off. After withdrawal of the sludge, 15 gallons of carbon tetrachloride were added, together with 1800 lbs. of anhydrous aluminum chloride. The mass was maintained at about 135° F. for a period of 20 hours and was agitated during the time.

The sludge formed during this operation is the sludge which I prefer to employ in the polymerizing of a subsequent batch. This sludge was allowed to settle and was thereupon removed. The remaining oil was treated with caustic soda, washed with water and was then reduced by steam distillation to separate it into the desired various fractions according to their viscosities.

In the above operation, about 20% by volume of the original distillate was polymerized to a lubricant having a viscosity of 200 sec. Saybolt at 210° F. When this same operation was carried out without the employment of carbon tetrachloride only about 6% by volume of the original distillate was polymerized to a lubricant having a viscosity of 200 sec. Saybolt at 210° F.

When the metal halide sludge, particularly aluminum chloride sludge, is employed to effect polymerization, substantially no water should be present in the oil, as the presence of an appreciable amount of water will cause the sludge to become very stiff so that operation of the apparatus may be impaired.

Although the present invention has been described in connection with the details of specific examples thereof, it must be understood that such details are not intended to be limitative of the invention, except insofar as set forth in the accompanying claims.

I claim:

1. The method of producing lubricant oils which comprises polymerizing unsaturated hydrocarbons of the paraffin series derived from pyrolytic decomposition of petroleum waxes into viscous oils in the presence of a catalyst comprising a metal halide and in the presence of an organic halide promoter, said polymerization being conducted at a temperature below 400° F.

2. The method of producing lubricant oils which comprises polymerizing unsaturated hydrocarbons of the paraffin series derived from pyrolytic decomposition of hydrocarbon material consisting mostly of petroleum wax hydrocarbons into viscous oils in the presence of a catalyst comprising a metal chloride and in the presence of an organic chloride promoter, said polymerization being conducted at a temperature below 400° F.

3. The method of producing lubricant oils which comprises polymerizing unsaturated hydrocarbons of the paraffin series derived from pyrolytic decomposition of petroleum waxes into viscous oils in the presence of a catalyst comprising a metal chloride and in the presence of an organic oil miscible hydrochloric acid-yielding promoter, said polymerization being conducted at a temperature below 400° F.

4. The method of producing lubricant oils which comprises polymerizing unsaturated hydrocarbons of the paraffin series derived from pyrolytic decomposition of petroleum waxes into viscous oils in the presence of a catalyst comprising aluminum chloride and in the presence of an organic chloride promoter, said polymerization being conducted at a temperature below 400° F.

5. The method of producing lubricant oils which comprises polymerizing unsaturated hydrocarbons of the paraffin series derived from pyrolytic decomposition of hydrocarbon material consisting mostly of petroleum wax hydrocarbons into viscous oils in the presence of a catalyst comprising a metal halide and in the presence of an alkyl halide, said polymerization being conducted at a temperature below 400° F.

6. The method of producing lubricant oils which comprises polymerizing unsaturated hydrocarbons of the paraffin series derived from pyrolytic decomposition of petroleum waxes into viscous oils in the presence of a catalyst comprising a metal chloride and in the presence of an alkyl halide, said polymerization being conducted at a temperature below 400° F.

7. The method of producing lubricant oils which comprises polymerizing unsaturated hydrocarbons of the paraffin series, of a type similar to that obtained by cracking paraffin wax into viscous oils in the presence of a catalyst comprising a metal chloride and in the presence of an alkyl chloride, said polymerization being conducted at a temperature below 400° F.

8. The method of producing lubricant oils which comprises polymerizing unsaturated hydrocarbons of the paraffin series of the type obtained by the pyrolyses of petroleum waxes into viscous oils in the presence of a catalyst comprising aluminum chloride and in the presence of an alkyl chloride, said polymerization being conducted at a temperature below 400° F.

9. The method of producing lubricant oils which comprises polymerizing unsaturated hydrocarbons of the paraffin series derived from pyrolytic decomposition of petroleum waxes into viscous oils in the presence of a catalyst comprising aluminum chloride and in the presence of carbon tetrachloride, said polymerization being conducted at a temperature below 400° F.

10. The method of producing lubricant oils which comprises polymerizing unsaturated hydrocarbons of the paraffin series derived from pyrolytic decomposition of petroleum waxes into viscous oils in the presence of a catalyst comprising a metal halide, withdrawing the sludge formed during such polymerization, and effecting polymerization of another body of unsaturated hydrocarbon materials into viscous oils by employing said sludge as a catalyst, said polymerization steps being conducted at a temperature below 400° F., and at least one of said polymerization steps being conducted in the presence of a halogen-containing organic promoter.

11. The method of producing lubricant oils which comprises polymerizing unsaturated hydrocarbons of the paraffin series of a type similar to that obtained by cracking paraffin wax into viscous oils in the presence of a catalyst comprising a metal chloride, withdrawing the sludge formed during such polymerization, and effecting polymerization of another body of unsaturated hydrocarbon materials into viscous oils by employing said sludge as a catalyst, said polymerization steps being conducted at a temperature below 400° F. and at least one of said polymerization steps being conducted in the presence of a halogen-containing organic promoter.

12. The method of producing lubricant oils which comprises polymerizing unsaturated hydrocarbons of the paraffin series derived from pyrolytic decomposition of hydrocarbon material consisting mostly of petroleum wax hydrocarbons into viscous oils in the presence of a catalyst comprising aluminum chloride, withdrawing the sludge formed during such polymerization, and effecting polymerization of another body of unsaturated hydrocarbon materials into viscous oils by employing said sludge as a catalyst, said polymerization steps being conducted at a temperature below 400° F. and at least one of said polymerization steps being conducted in the presence of a halogen-containing organic promoter.

13. The method of producing lubricant oils which comprises polymerizing unsaturated hydrocarbons of the paraffin series derived from pyrolytic decomposition of petroleum waxes into viscous oils in the presence of a catalyst comprising a metal halide, withdrawing the sludge formed during such polymerization, effecting partial polymerization of another body of unsaturated materials into viscous oils by employing said sludge as a catalyst, said polymerization steps being conducted at a temperature below 400° F. and at least one of said polymerization steps being conducted in the presence of a halogen-containing organic promoter, and completing the polymerization of said body of unsaturated hydrocarbons in the presence of a catalyst comprising a metal halide.

14. The method of producing lubricant oils which comprises polymerizing unsaturated hydrocarbons of the paraffin series derived from pyrolytic decomposition of hydrocarbon material consisting mostly of petroleum wax hydrocarbons into viscous oils in the presence of a catalyst comprising a metal chloride, withdrawing the sludge formed during such polymerization, effecting partial polymerization of another body of unsaturated materials into viscous oils by employing said sludge as a catalyst, and completing the polymerization of said body of unsaturated hydrocarbons in the presence of a catalyst comprising a metal chloride, said polymerization steps being conducted at a temperature below 400° F. and at least one of said polymerization steps being conducted in the presence of a halogen-containing organic promoter.

15. The method of producing lubricant oils which comprises polymerizing unsaturated hydrocarbons of the paraffin series derived from pyrolytic decomposition of hydrocarbon material consisting mostly of petroleum wax hydrocarbons into viscous oils in the presence of a catalyst comprising aluminum chloride, withdrawing the sludge formed during such polymerization, effecting partial polymerization of another body of unsaturated materials into viscous oils by employing said sludge as a catalyst, and completing the polymerization of said body of unsaturated hydrocarbons in the presence of a catalyst comprising aluminum chloride, said polymerization steps being conducted at a temperature below 400° F. and at least one of said polymerization steps being conducted in the presence of a halogen-containing organic promoter.

16. The method of producing synthetic lubricating oils of low viscosity temperature coefficient comprising polymerizing unsaturated hydrocarbons of the paraffin series derived from pyrolytic decomposition of hydrocarbon wax, employing for said polymerization aluminum chloride as a catalyst; promoting said polymerization by adding to the hydrocarbons an alkyl halide in amounts of less than 0.5% by volume, conducting the polymerization at a temperature below 400° F., separating the polymerized product from the sludge and recovering the oil and the sludge for further treatment and use.

17. The method of producing lubricant oils which comprises polymerizing unsaturated hydrocarbons of the type obtained by the pyrolysis of petroleum waxes into viscous oils in the presence of a catalyst comprising an anhydrous trivalent metal halide and in the presence of an organic halide, said polymerization being conducted at a temperature within the range of 100–250° F.

18. The method of producing lubricant oils which comprises polymerizing unsaturated hydrocarbons of the paraffin series derived from pyrolytic decomposition of hydrocarbon material consisting substantially entirely of petroleum wax hydrocarbons into viscous oils in the presence of a catalyst comprising aluminum chloride and in the presence of an oil soluble aliphatic halide, said polymerization being conducted at a temperature below 400° F.

19. The process of making viscous hydrocarbon lubricants from the unsaturated hydrocarbons of the paraffin series of the type obtainable by pyrolysis of petroleum wax which comprises subjecting said hydrocarbons to the polymerizing action of aluminum chloride in the presence of a hydrogen halide, said polymerization being conducted at a temperature within the range of 100–250° F.

20. The process of making hydrocarbon lubricants which comprises subjecting petroleum wax hydrocarbons to a pyrolytic treatment to produce unsaturated, straight chain hydrocarbon oils therefrom, introducing an alkyl halide into said unsaturated oil and then subjecting the oil to the polymerizing action of aluminum chloride at a temperature within the range of 100–400° F. whereby viscous hydrocarbon lubricants are produced.

21. The process of making hydrocarbon lubricants which comprises subjecting paraffin wax hydrocarbons to a pyrolytic treatment to produce unsaturated, straight chain hydrocarbon oils therefrom, introducing hydrogen chloride into said unsaturated oil and then subjecting the oil to the polymerizing action of aluminum chloride at a temperature within the range of 100–400° F. whereby viscous hydrocarbon lubricants are produced.

22. In the polymerization of unsaturated hydrocarbons of the paraffin series derived from pyrolytic decomposition of hydrocarbon material consisting substantially entirely of petroleum wax hydrocarbons by metal halides at a temperature below 400° F., the step of adding to the reacting materials an oil miscible promoter capable of yielding hydrogen chloride in the presence of the metal halide.

HAROLD R. SNOW.